(12) United States Patent
Adra

(10) Patent No.: US 9,118,225 B2
(45) Date of Patent: Aug. 25, 2015

(54) COIL WITH TWISTED WIRES AND STATOR ASSEMBLY OF A ROTARY ELECTRIC MACHINE

(75) Inventor: Rodwan T. Adra, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 222 days.

(21) Appl. No.: 13/594,429

(22) Filed: Aug. 24, 2012

(65) Prior Publication Data

US 2014/0055000 A1    Feb. 27, 2014

(51) Int. Cl.
    *H02K 15/04* (2006.01)
    *H02K 3/14* (2006.01)
    *H02K 3/18* (2006.01)
    *H02K 3/48* (2006.01)

(52) U.S. Cl.
    CPC .. *H02K 3/14* (2013.01); *H02K 3/18* (2013.01); *H02K 15/0457* (2013.01); *Y10T 29/49009* (2015.01)

(58) Field of Classification Search
    CPC ........... H02K 3/14; H02K 3/48; H02K 15/04; H02K 15/0414; H02K 15/0421; H02K 15/0428
    USPC ...................... 310/213, 195–208; 29/598–606
    See application file for complete search history.

(56) References Cited

U.S. PATENT DOCUMENTS

| | | | |
|---|---|---|---|
| 7,201,244 B2 | 4/2007 | Johnston et al. | |
| 7,202,625 B2 | 4/2007 | Adra et al. | |
| 2002/0050395 A1* | 5/2002 | Kusumoto et al. | 174/128.2 |
| 2004/0098856 A1* | 5/2004 | Kuroyanagi et al. | 29/596 |
| 2006/0170389 A1 | 8/2006 | Adra | |
| 2008/0122310 A1* | 5/2008 | Joho | 310/201 |
| 2009/0127966 A1* | 5/2009 | Saari et al. | 310/213 |
| 2009/0320275 A1 | 12/2009 | Dobashi et al. | |
| 2010/0181413 A1 | 7/2010 | Decker | |
| 2011/0025164 A1* | 2/2011 | Tanaka et al. | 310/206 |
| 2011/0210642 A1 | 9/2011 | Chiba et al. | |

FOREIGN PATENT DOCUMENTS

| | | |
|---|---|---|
| EP | 1930918 A2 | 6/2008 |
| GB | 1384733 A | 2/1975 |
| JP | 2005117751 | 4/2005 |
| JP | 2008148375 | 6/2008 |
| JP | 2009183012 | 8/2009 |

\* cited by examiner

*Primary Examiner* — Michael Andrews
(74) *Attorney, Agent, or Firm* — Leydig, Voit & Mayer, Ltd.

(57) ABSTRACT

A rotary electric machine includes a stator having an open slot configuration and a plurality of stator poles with a coil positioned about each stator pole. Each coil has a plurality of electrically conductive wires defining a group of wires and the group of wires is wrapped generally around a stator pole to define a plurality of turns. At least a portion of the group of wires is twisted, and the portion of the group of wires has between approximately 1 and 5 twists per turn. A method of fabricating a stator assembly is also disclosed.

17 Claims, 6 Drawing Sheets

COIL WITH TWISTED WIRES AND STATOR ASSEMBLY OF A ROTARY ELECTRIC MACHINE

TECHNICAL FIELD

This disclosure relates generally to a rotary electric machine and, more particularly, to a coil and stator assembly of a rotary electric machine and a method of fabricating a coil and stator assembly.

BACKGROUND

Work machines may be powered by electrical propulsion systems. The electrical propulsion systems sometimes include electric drive traction systems that provide driving forces to traction devices of the work machines. In some electric drive fraction systems, switched reluctance motors are used to provide the driving force.

Switched reluctance motors may have various motor topologies (e.g., the number of stator poles, the number of coils, and the number of rotor poles). In addition, a switched reluctance motor may be configured with a plurality of phases (e.g., 2 phases, 3 phases, 4 phases, or more). A switched reluctance motor may have a plurality of stator poles, each with a winding of electrically conductive wires or coil positioned therearound. The number of wires and the configuration of the coil is one factor that affects the efficiency of the operation of the switched reluctance motor.

Many switched reluctance motors are designed to optimize operation under certain operating conditions. However, it is desirable for switched reluctance motors used to power certain work machines to operate efficiently at both low speeds with high current and at higher speeds with lower current. The coils of some motors perform well electrically but lack the ability to carry significant amounts of current without excessive coil heating. Other coils have increased current carrying capacity but do not perform efficiently as operating frequencies increase, which also limits their ability to power work machines.

U.S. Pat. No. 7,201,244 discloses a work machined powered by a switched reluctance motor. The coils used in the switched reluctance motor are formed with wires having a square cross-section to increase the density of the conductor or fill within the stator slot between each stator pole. However, as the operating frequencies of the motor increase, the electrical characteristics of the coil will limit the efficiency of operation of the motor.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a rotary electric machine includes a stator having an open slot configuration and a rotor positioned within the stator. The stator has a plurality of stator poles and a plurality of stator slots. Each stator slot is positioned between a pair of the stator poles. The rotor has a plurality of rotor poles. A coil is positioned about each stator pole. Each coil has a plurality of electrically conductive wires defining a group of wires and the group of wires is wrapped generally around its respective stator pole to define a plurality of turns of the group of wires. At least a portion of the group of wires is twisted, and the portion of the group of wires has between approximately one and five twists per turn.

In another aspect, a rotary electric machine includes a stator having a plurality of stator poles and a plurality of stator slots. Each stator pole has first and second oppositely facing side surfaces and each stator pole is positioned between the first and second stator slots. Each stator slot has an outer surface, an inner boundary, and a centerline extending generally along a midpoint between opposed side surfaces of adjacent stator poles. A rotor is positioned within the stator and has a plurality of rotor poles. A coil is positioned about each stator pole. Each coil has a plurality of electrically conductive wires defining a group of wires with the group of wires being wrapped generally around its respective stator pole to define a plurality of turns of the group of wires about the stator pole. At least a portion of the group of wires is twisted with the portion of the group of wires has between approximately one and five twists per turn. Each coil has a first portion and a second portion with the first portion and the second portion being positioned within adjacent stator slots separated by the respective stator pole. Each first portion extends generally between the first side surface of the respective stator pole and the centerline of the first stator slot along a path generally from the outer surface of the first stator slot towards the inner boundary of the stator slot, and each second portion extends generally between the second side surface of the respective stator pole and the centerline of the second stator slot along a path generally from the outer surface of the second stator slot towards the inner boundary of the stator slot.

In still another aspect, a method of fabricating a stator assembly of a rotary electric machine includes providing a stator having a plurality of stator poles. A plurality of coils are formed by supplying a plurality of electrically conductive wires to define a group of wire, twisting the group of wires at a predetermined rate, and wrapping the group of wires a predetermined number of turns to form a coil. The step of twisting the group of wires includes twisting the group of wires between approximately one and five twists per turn of the coil. The group of wires is configured so that each of the electrically conductive wires of each turn is laterally movable relative to others of the electrically conductive wires of the turn along at least a portion thereof. After forming, each coil is mounted on a stator pole.

DETAILED DESCRIPTION

Figure 1:
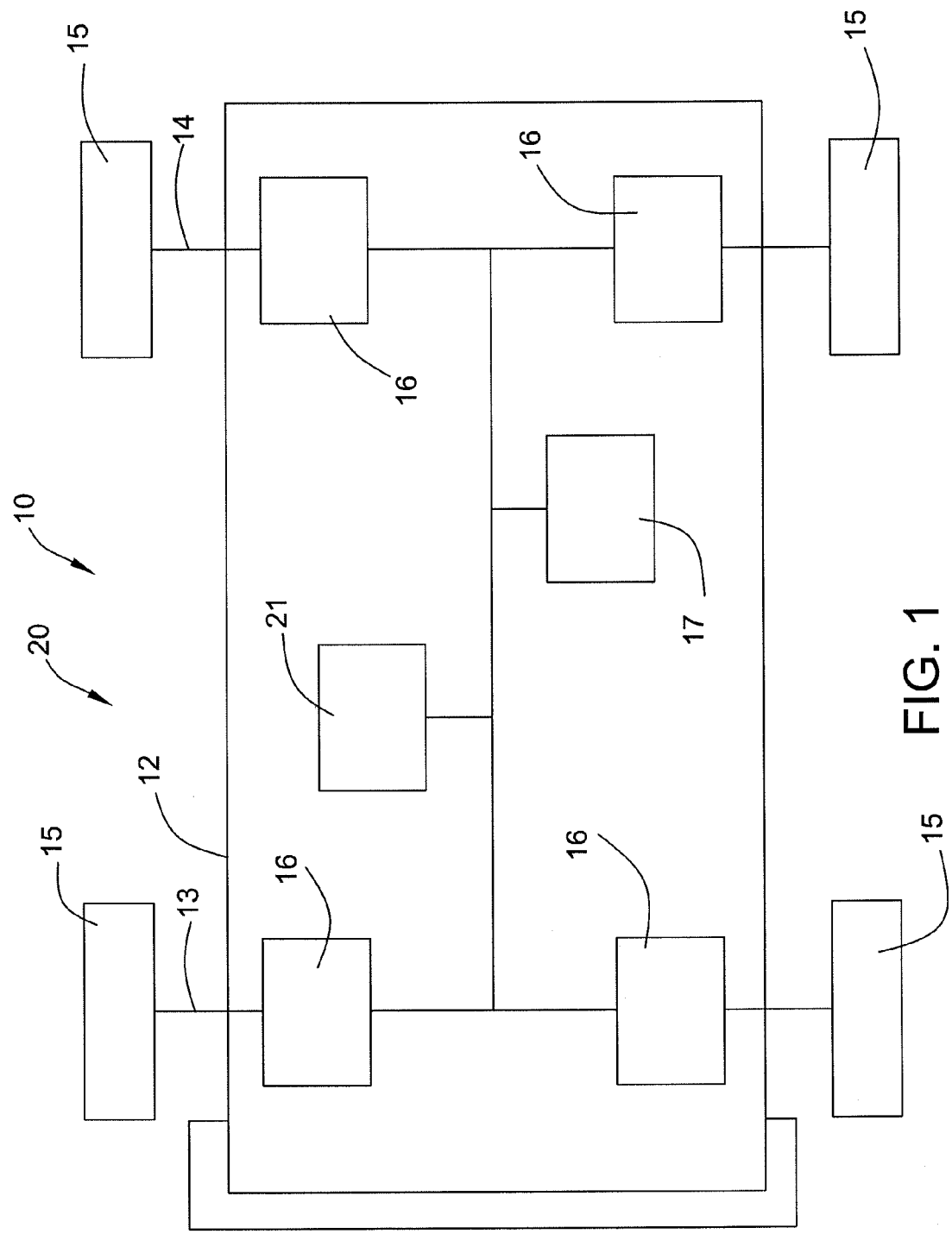
FIG. 1 is a diagrammatic view of a work machine incorporating certain aspects of the disclosure therein.

Referring to FIG. 1, a machine 10 is schematically depicted including a chassis 12 with a front axle 13 and a rear axle 14. A traction device 15 (e.g., wheels, tracks, etc) may be mounted on each end of each axle and may be driven by a switched reluctance traction system 16. A power source 17 provides electrical power to the switched reluctance traction systems 16. Power source 17 may use a prime mover (not shown) such as an internal combustion engine coupled with a generator (not shown) to supply electrical power to the switched reluctance fraction systems 16. In another embodiment, power source 17 may be a fuel cell generator (not shown) configured to supply directly electrical power to the switched reluctance traction systems 16. Still further, power source 17 may include a hybrid system including two or more different types of devices for converting an energy supply to electrical energy or for directly supplying electrical energy.

A controller 21 may be used to control operation of the switched reluctance traction systems 16 as well as the power source 17 and other components and systems of the machine 10. Controller 21 may be a component of a control system shown generally at 20 in FIG. 1 to indicate association with machine 10. Control system 20 may include one or more sensors to provide data and other input signals representative of various operating parameters of the machine 10.

The controller 21 may be an electronic controller that operates in a logical fashion to perform operations, execute control algorithms, store and retrieve data and other desired operations. The controller 21 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller such as power supply circuitry, signal conditioning circuitry, driver circuitry, and other types of circuitry.

The controller 21 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 21 may be implemented in hardware and/or software without regard to the functionality. The controller 21 may control the switched reluctance traction systems 16 and other functions of the machine 10.

Figure 2:
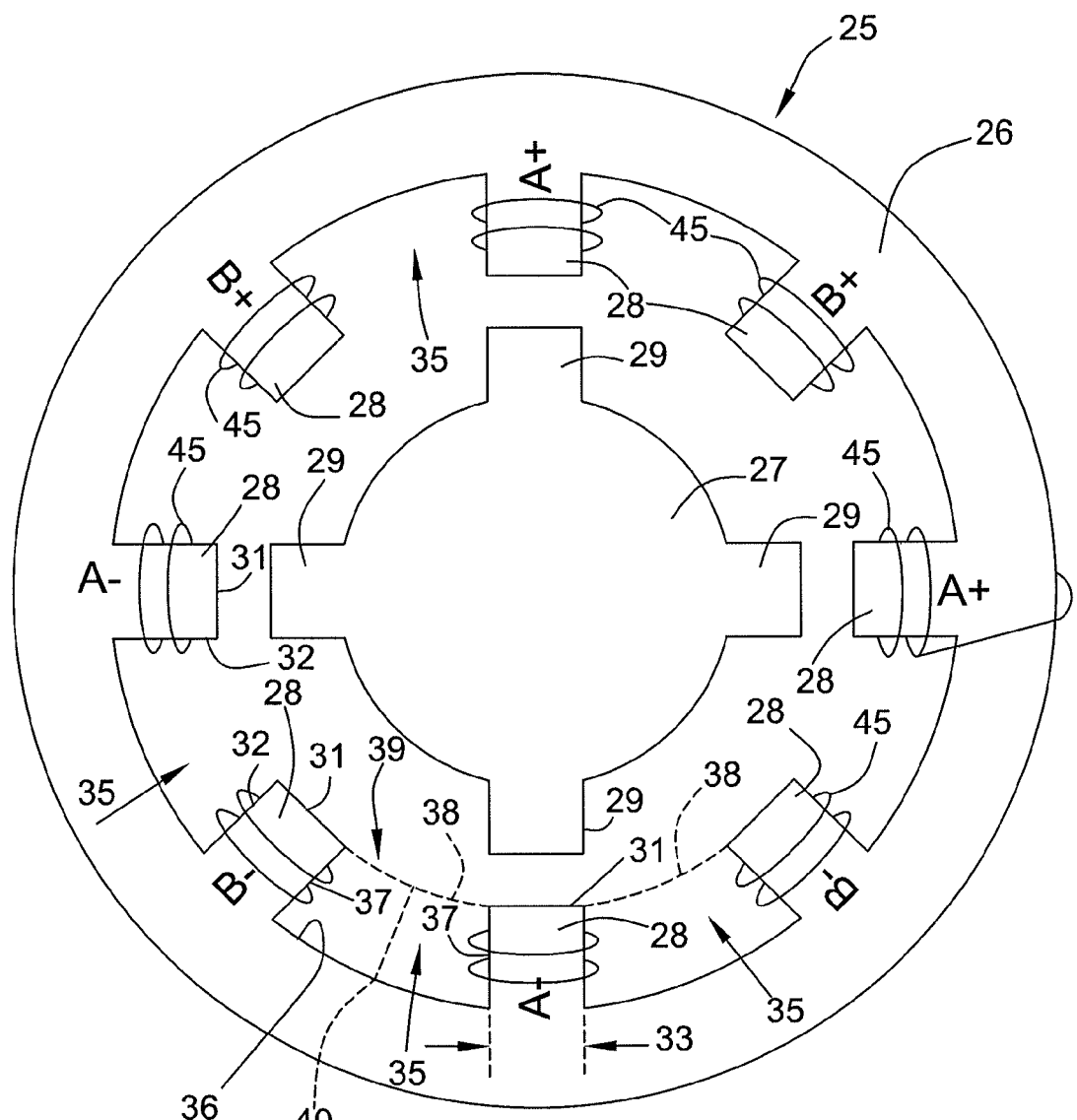
FIG. 2 is a diagrammatic top view of a portion of a switched reluctance motor incorporating certain aspects of the disclosure therein.

FIG. 2 depicts a schematic view of a rotary electric machine such as a switched reluctance motor 25 that may be associated with each switched reluctance traction system 16. As depicted in FIG. 2, an 8/4 2-phase switched reluctance motor 25 (i.e., eight stator poles 28, four rotor poles 29, and 2-phase conduction) may include a stator 26 and a rotor 27 rotatable relative to the stator. The number of phases as well as the number of stator poles 28 and rotor poles 29 is exemplary only and not intended to be limiting. In other words, the switched reluctance motor 25 may have a first plurality of stator poles 28 and a second plurality of rotor poles 29.

As depicted, stator 26 includes eight radially inwardly projecting stator poles 28 and rotor 27 includes four radially outwardly projecting rotor poles 29. Each stator pole 28 projects radially inward and has an inward end face 31 and a pair of oppositely facing side surfaces 32. The distance, indicated at 33, between the oppositely facing side surfaces 32 (i.e., a first side surface and a second side surface of the stator pole 28) is generally constant so that each pole has a generally constant width in a circumferential direction around the stator 26.

Figure 6:
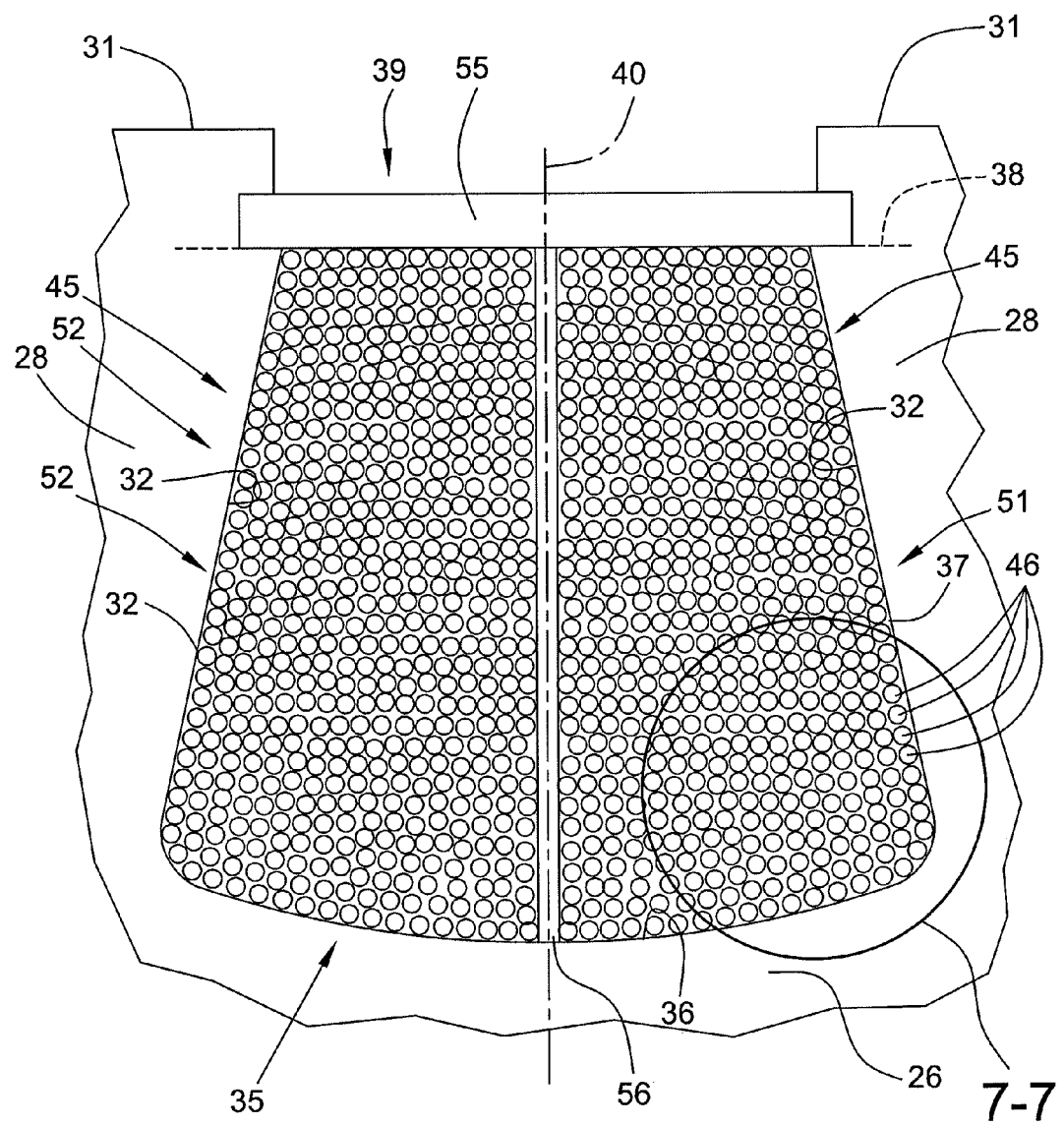
FIG. 6 is a section taken generally along line 6-6 of FIG. 5.

Stator 26 further includes a plurality of stator slots 35 with each stator slot being angularly positioned between a pair of the stator poles 28 and thus each stator pole 28 is angularly positioned between a pair of adjacent stator slots 35. Accordingly, the number of stator slots 35 is equal in number to the number of stator poles 28. Each stator slot 35 opens towards rotor 27 and has an edge or outer surface 36, opposed side edges 37 defined by the oppositely facing side surfaces 32 of adjacent stator poles 28, and an inner boundary 38 extending generally along or across the opening 39 of the stator slot. As described below, a retention structure 55 may span the opposed side edges 37 across the opening 39 to retain coils 45 positioned on each stator pole 28 within the stator slots 35. Accordingly, the inner boundary 38 of each stator slot 35 may be spaced from the inward end face 31 of each stator pole 28 as best seen in FIG. 6.

Due to the circular cross-section of the stator 26 and the generally constant width of each stator pole 28 in an arcuate or circumferential direction, each stator slot 35 has a width that tapers or narrows generally uniformly or linearly from the outer surface 36 towards the opening 39. With such a structure, the stator 26 may be referred to as having an open slot configuration. A centerline 40 of each stator slot 35 extends between adjacent pairs of stator poles to extend generally along the midpoint between the opposed side edges 37 of the stator slot.

The stator poles 28 may be grouped in two or more stator pole 28 sets that correspond to the number of phases (e.g., 2) of the switched reluctance motor 25. In the depicted example, the eight stator poles 28 are grouped in two phase sets with four stator poles (depicted as $A^+$ and $A^-$) grouped into one phase set and four stator poles (depicted as $B^+$ and $B^-$) grouped into the other phase set. The rotor poles 29 may be grouped in diametrically aligned pairs.

Figure 3:
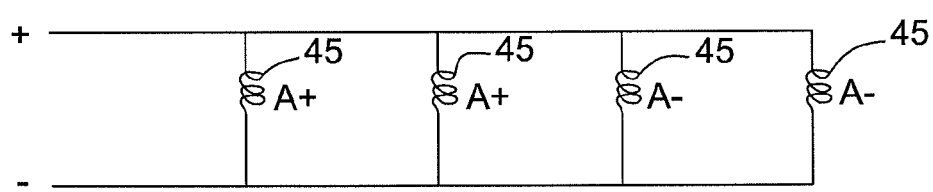
FIG. 3 is a simplified schematic view of a portion of an electrical circuit including coils of the switched reluctance motor of FIG. 2.

Each stator pole 28 has a conductive winding or coil 45 wrapped therearound. The coils 45 positioned about the stator poles 28 of each group of a phase set ($A^+$, $A^-$ and $B^+$, $B^-$) are electrically connected and may be configured as part of an electrical circuit, either in parallel or in series. FIG. 3 depicts the coils of phase A connected in parallel. The coils of phase B may be arranged in a manner similar to the coils of FIG. 3.

Switched reluctance motor 25 has a rotor 27 with no windings or magnets. The rotor 27 may be formed of a stack of vertically laminated iron, one-piece continuous annular members (not shown). Rotors 27 having other structures and configurations are contemplated. In addition, while the motor of FIG. 2 is depicted as a switched reluctance motor, the concepts disclosed herein are applicable to other rotary electric machines such as a switched reluctance generator. The concepts are further applicable to other rotary electric machines, for example, one in which the rotor 27 has permanent magnets or some other structure or configuration.

In operation, rotation of the rotor 27 of the switched reluctance motor 25 is achieved by the sequential excitation or energization of adjacent sets of stator poles 28 by supplying DC current to the coils 45 of the stator poles 28. Energization of the stator poles 28 creates magnetic flux towards which the rotor poles 29 are attracted which tends to align the rotor poles 29 with the energized stator poles 28. As the rotor poles 29 become aligned with the energized stator poles 28, the DC current to the energized poles is terminated and subsequently supplied to the next sequential stator poles 28. The rotor poles 29 are then attracted to the next set of sequential poles, which causes continued rotation of the rotor 27. This process is continued during operation of the switched reluctance motor 25. Torque is generated by the tendency of rotor poles 29 to align with energized stator poles 28. Continuous torque may be generated by synchronizing excitation of consecutive stator poles 28 with the instantaneous position of rotor poles 29.

Figure 4:
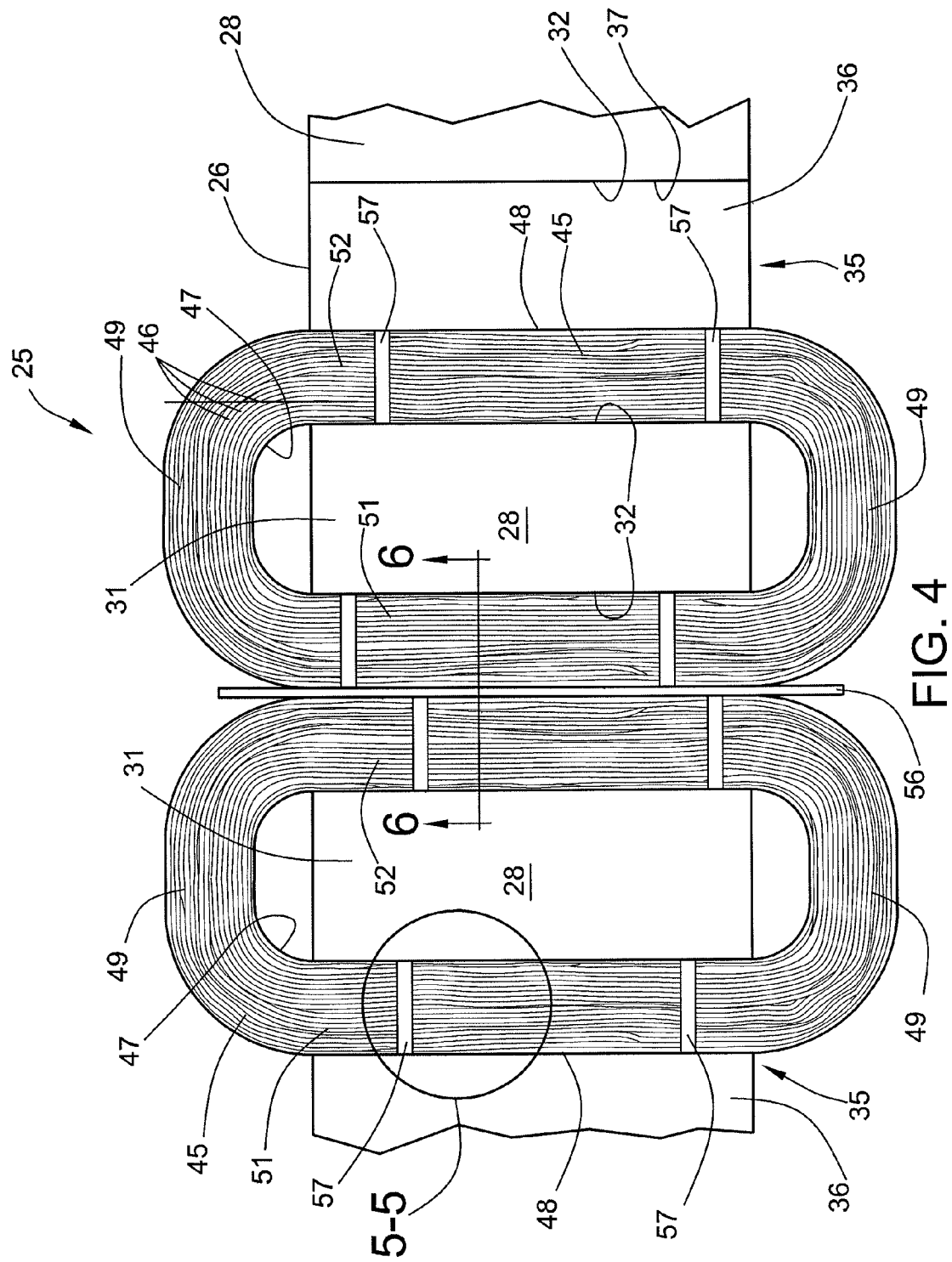
FIG. 4 is an end view of a portion of a stator assembly taken from the perspective of the rotor within the stator with certain components removed for clarity.
Figure 5:
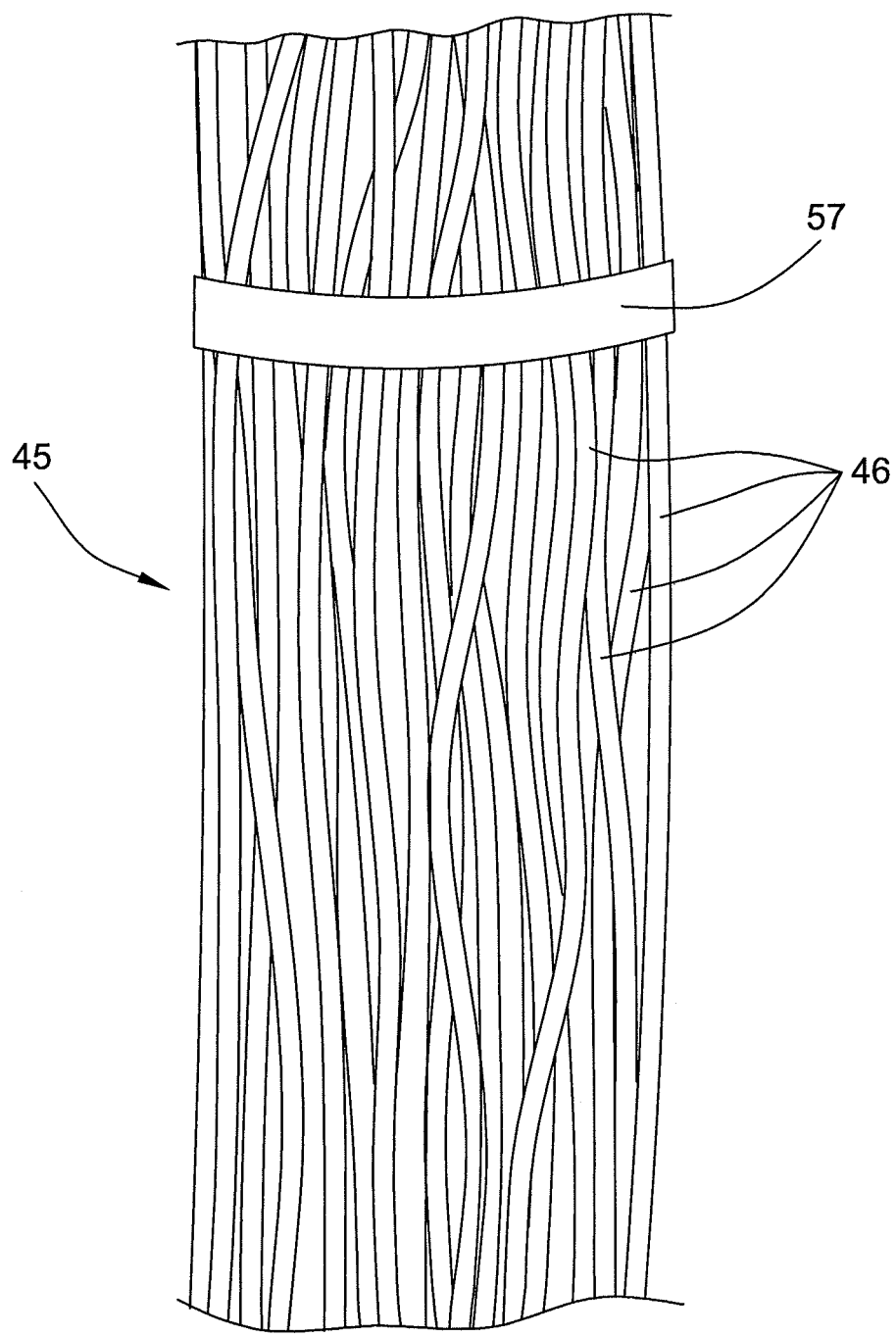
FIG. 5 is an enlarged view of the circled portion 5-5 of one of the coils in FIG. 4.

Referring to FIG. 4, a portion of the stator 26 is depicted with two coils 45 positioned about adjacent stator poles 28. Each coil 45 may be generally identical and is formed of a plurality of electrically conductive wires 46 that define a group of wires that are wrapped in a generally oval manner around the central opening 47 a predetermined number of times or turns. The central opening 47 generally corresponds in size to the cross section of the stator poles 28 so that the coil 45 may be slid onto the stator pole 28 during the fabrication of the switched reluctance motor 25. Each coil 45 has a pair of long or major sides 48 and a pair of short or minor sides 49 interconnecting the pair of major sides. Accordingly, each coil 45 has a first portion 51 that extends through a first stator slot 35 and a second portion 52 that extends through a second, stator slot 35. The second stator slot 35 is adjacent the first stator slot with the first and second stator slots separated by a stator pole 28.

The coil may be formed of a plurality of electrically conductive wires 46, each having a generally circular cross-section. The electrically conductive wires 46 may have a non-circular cross-section such as oval, square or rectangular in some configurations. The electrically conductive wires 46 may be formed of a highly conductive, flexible material, such as copper, and have a layer of insulation thereon. In one embodiment, magnet wires having a layer of enamel insulation may be used.

In one embodiment, a coil 45 may be fabricated with a pair of major sides 48 of approximately eight inches in length and a pair of minor sides 49 of approximately two inches in length. The group of wires may include seven electrically conductive wires 46, each having a diameter of approximately 0.05 inches, and may be wrapped around the central opening 47 fifty-six times. Such a coil may also be referred to as having fifty-six turns. In other similar embodiments, the group of wires may include between approximately five and nine electrically conductive wires 46. Other numbers of electrically conductive wires 46 may be used if desired. Examples using as few as two electrically conductive wires 46 and as many as thirty wires have been contemplated.

The electrically conductive wires 46 may also have other diameters. In another embodiment, the electrically conductive wires 46 may be approximately 15-18 gauge wire. Other numbers of electrically conductive wires 46 and those having other diameters may also be used. For example, increasing the number of wires while decreasing their diameter may result in comparable performance. However, in some circumstances, increasing the number of wires may undesirably increase the amount of insulation as a percent of the cross-section of the group of wires.

The number of turns or times that the group of wires is wrapped around the central opening 47 may be determined or set based upon the desired electrical performance of the switched reluctance motor 25. Accordingly, the number of turns about the central opening 47 may be adjusted as desired.

The group of wires that is wrapped around the central core is formed of individual electrically conductive wires 46 that may also be twisted together. The twisting of the wires may be achieved in a variety of manners. In one example, the electrically conductive wires 46 may be generally continuously twisted generally about an axis through the group of wires. In another example, the electrically conductive wires 46 may be fed from a plurality of wire supplies (not shown) through a tensioner (not shown) and the tensioner (as well as the wire supplies, if desired) may be rotated to twist the wires. If desired, the electrically conductive wires 46 may be twisted as they are being fed and wrapped around a fixture (not shown) to form the coil 45.

Regardless of the manner of twisting the electrically conductive wires 46, the twist forms a relatively loose twist of the wires. Such a loose twist of wires may permit the individual electrically conductive wires 46 to move laterally relative to the other wires of the group as the coil 45 is being mounted on a stator pole 28. In the example described above, the group of wires may be twisted approximately two times as they travel about the central opening 47. As the electrically conductive wires 46 are twisted, the group of wires may take on a somewhat circular cross-section. However, the loose twist of the wires permits lateral movement of each electrically conductive wire 46 relative to other wires within the group of wires. Once the coil 45 is mounted on the stator pole 28, the electrically conductive wires 46 may have moved laterally sufficiently so that each turn or wrap of the group of wires may not be readily discernible from other turns or wraps of the wires and the individual electrically conductive wires 46 may appear to be relatively randomly positioned or positioned in a non-uniform array within each stator slot 35.

Although the group of wires in the depicted embodiment is twisted twice for each wrap around the central opening 47, in other embodiments the electrically conductive wires 46 may be twisted between approximately one and five times as they are wrapped about the central opening 47. In other applications and configurations, it may be possible to twist the group of wires at a slower or a faster rate if such twist permits the electrically conductive wires 46 to be moved laterally and the positioning of the electrically conductive wires satisfies the desired electrical performance.

FIG. 6 depicts a cross-section through a stator slot 35 and a pair of adjacent stator poles 28 having coils 45 positioned therearound. The first portion 51 of one coil 45 and the second portion 52 of a second, adjacent coil 45 are each positioned within the stator slot 35. A non-conductive spacer 56 may be positioned generally along the centerline 40 of each stator slot 35 to separate the first portion 51 of one coil 45 from the second portion 52 of the second, adjacent coil 45. Because the electrically conductive wires 46 are loosely twisted when forming the group of wires, they are laterally movable relative to other of the electrically conductive wires within a turn at least along the major sides 48 of the coil 45. Accordingly, as the coils 45 are slid onto the stator poles 28, the individual electrically conductive wires 46 may move to fill relatively tightly the stator slot 35. This movement may result in a significant number of openings or gaps between adjacent turns of the group of wires being filled due to the lateral movement of the electrically conductive wires 46.

As stated above, because of the relatively loose twist of the electrically conductive wires 46, the wires may move laterally as each coil 45 is mounted on its stator pole 28. The electrically conductive wires 46 along the major sides 48 of the coil may move laterally within their stator slot 35 to reduce the number and size of the openings between wires. In some instances, the portion of the wires along the minor sides 49 of each coil 45 may move so as to relatively reduce or eliminate the twist of the wires along the minor side. As such, each turn of the group of wires is still twisted but the twisted portion may tend to be concentrated in a portion of the turn along the major side 48 of the coil 45. As such, while the electrically conductive wires 46 may be relatively consistently twisted as the coil 45 is formed, the twist may not be consistent along the length of each turn.

Figure 7:
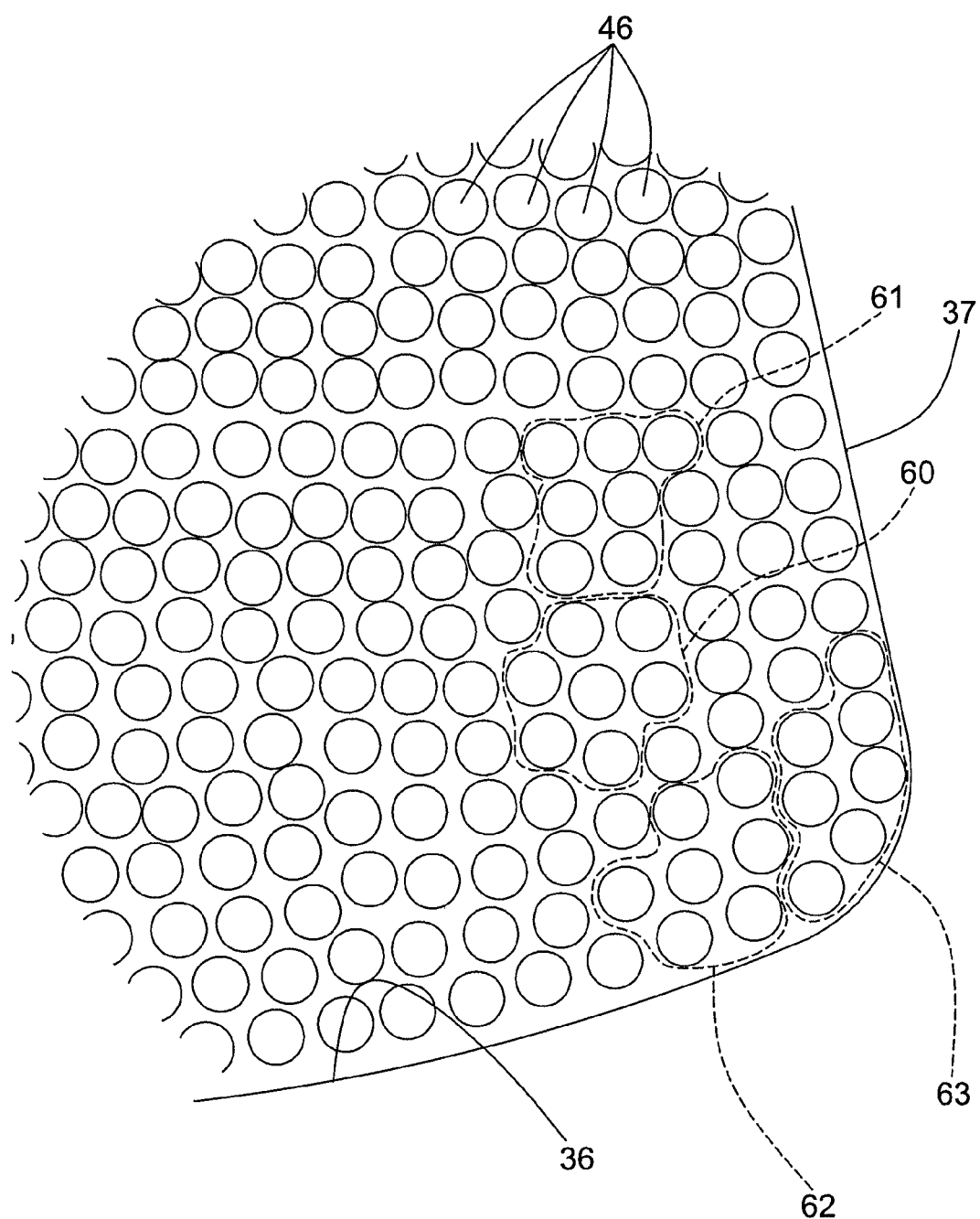
FIG. 7 is an enlarged view of the circled portion 7-7 of a portion of a coil in FIG. 6.

As may be seen in FIG. 6, interstices or uniform voids between adjacent turns of the group of wires along the cross-section through the stator slot 35 may be significantly reduced or even generally eliminated. In other words, because of the loose twist of the individual electrically conductive wires 46 of the group of wires, the wires may move laterally so that the individual wires appear to be generally randomly placed and the outline or boundary of each turn or wrap of the group of wires is substantially eliminated. For example, in FIG. 7, a first turn 60 of the group of wires is depicted with a somewhat circular cross-section or boundary. A second turn 61 of the group of wires is depicted with a somewhat rectangular cross-section. A third turn 62 of the group of wires and a fourth turn 63 of the group of wires each have a generally different cross-section. As such, even though the group of wires may have initially had a generally circular-cross section, upon positioning the coil 45 within the stator slot 35, the wires within many or even all of the turns of the group of wires may be shifted to have non-circular cross-sections.

Referring back to FIG. 6, a retention structure 55 such as a generally non-conductive board-like member may span the opposed side edges 37 of the stator slots generally adjacent and across the opening 39 to retain the coils 45 positioned on each stator pole 28 within the stator slots 35. (It should be noted that retention structure 55 is not depicted in FIG. 4 for clarity but extends between the stator poles 28 and across each stator slot 35 as depicted in FIG. 6.)

With the disclosed structure, a relatively dense coil configuration (i.e., a reduced amount of air) may be created. The first portion 51 of each coil 45 generally fills one stator slot 35 between the side surface 32 of one stator pole 28 and the centerline 40 of the stator slot along a first path generally from the outer surface 36 of the stator slot 35 to the inner boundary 38 of the stator slot. Similarly, the second portion 52 of the same coil 45 generally fills the stator slot 35 on the opposite side of the stator pole 28 between the opposite side of the stator pole 28 and the centerline 40 of its stator slot 35 along a second path generally from the outer surface 36 towards the inner boundary 38 of the stator slot. Upon positioning a coil 45 around each stator pole 28, each stator slot 35 will have a first portion 51 of one coil 45 and a second portion 52 of an adjacent coil positioned therein. The non-conductive spacer 56 may be positioned between the first portion 51 of one coil 45 and the second portion 52 of a second, adjacent coil. In addition, the first portion 51 and second portion 52 may be retained within a stator slot 35 by retention structure 55.

To form the coil 45, a plurality of individual wire supplies (not shown) may be positioned on a rotatable fixture or turntable (not shown) with the electrically conductive wires 46 defining a group of wires being fed through a tensioning structure (not shown). The tensioning structure may include a plurality of openings through which the electrically conductive wires 46 pass or a single common opening.

The electrically conductive wires 46 may be fed from the tensioning structure and wound about a collapsible bobbin or fixture (not shown) having an outer surface generally conforming in size and shape to the central opening 47. As the group of wires is wound about the fixture, the turntable may be rotated at a predetermined rate so that the electrically conductive wires 46 are twisted as they are also wound about the fixture. In other words, the group of wires may be twisted by rotating the turntable as the group of wires is wound around the fixture to fabricate the coil 45. In another embodiment, the group of wires may be twisted as part of a separate process prior to winding the wires around the fixture or provided by a supplier as a pre-twisted group of wires.

The speed at which the turntable is rotated to twist the electrically conductive wires 46 may be set based upon the rate at which the group of wires is wrapped around the fixture. In one embodiment, the turntable may be set to twist the electrically conductive wires 46 a predetermined number of times (e.g., between approximately one and five twists) per turn of the group of wires about the fixture. This relationship (approximately one to five twists per turn) may be maintained even with a relatively wide range in size of the coil 45. Some coils are contemplated having a major side 48 as small as three inches in length and others are contemplated with a major side 48 as large as twenty-five inches in length. The disclosed structure may also be used with coils of other sizes outside of this range.

Still further, the disclosed concepts may be used by specifying the number of twists of the electrically conductive wires 46 that form the group of wires per unit length. In other words, rather than specifying the number of twists of the electrically conductive wires 46 per turn of the group of wires, it may be desirable to specify the number of twists per unit length (e.g., twists per inch) of the wires.

Once the electrically conductive wires 46 have been wound or wrapped about the fixture a desired number of times, the wires of the coil 45 may be secured together such as by tape 57 and the coil removed from the fixture. Coils 45 of this type are sometimes referred to as concentrated coils as the windings form a multi-turn coil having the same magnetic axis and are fixed around a single stator pole 28.

The stator 26 may be formed by stacking a plurality of one-piece continuous annular iron members (not shown) together. A layer of insulative material (not shown) may be provided between each iron member. The coils 45 may be mounted on the stator 26 by moving the coils relative to the stator to slide a stator pole 28 through the central opening 47 of each coil 45. While sliding the coils 45 onto each stator pole 28, at least a portion of at least some of the electrically conductive wires 46 of each turn may move laterally relative to other electrically conductive wires 46 of the same turn. In one embodiment, the portions of the electrically conductive wires 46 being laterally moved are positioned along the major sides 48 of the coil 45. This configuration generally eliminates interstices or uniform voids between adjacent turns of the group of wires along a cross-section of each coil 45 across each stator slot 35. It should be noted that the coils 45 may be initially formed with a generally symmetrical cross-section and the lateral movement of at least some of the electrically conductive wires 46 of each turn while mounting the coils 45 on the stator poles 28 may modify the shape of the coil to form a generally asymmetrical cross-section across a portion thereof. The asymmetrical cross-section may extend across a portion of a pair of adjacent stator slots 35 that are separated by a stator pole 28.

The coils 45 may be secured within the stator slots 35 such as by inserting a retention structure 55 that may span the opposed side edges 37 of the stator slots generally adjacent and across the opening 39. Coils 45 mounted on opposite stator poles 28 may be electrically connected to form opposed coil pairs. The windings of such opposed coil pairs may be electrically connected in parallel or series as part of an electrical circuit as desired.

INDUSTRIAL APPLICABILITY

The industrial applicability of the rotary electric machine described herein will be readily appreciated from the foregoing discussion. The foregoing discussion is applicable to rotary electric machines such as switched reluctance motors 25 in which it is desirable to increase the electrical efficiency and performance of the rotary electric machine over a range of operating conditions.

Through the disclosed rotary electric machine configuration and the method of fabricating a stator assembly, improved electrical performance, efficiency and decreased copper losses may be achieved. For example, the switched reluctance motor 25 using the coil 45 depicted herein may significantly reduce copper losses in the motor. For example, losses due to skin effects of the conductors may be substantially reduced due to the relatively small diameter of the electrically conductive wires 46 as compared to the operating frequency of the switched reluctance motor 25. In addition, the relatively small diameter of the electrically conductive wires 46 also reduces eddy currents within the conductors. Still further, the higher density of copper within the stator slot 35 (as depicted in FIG. 6) also may improve the thermal conductivity by reducing the air gaps between the individual electrically conductive wires 46 of the group of wires.

Proximity effects are also reduced through the disclosed structure by the relatively random positioning of the individual electrically conductive wires 46 within the group of wires. This is in part due to the relatively loose twist of the wires and the lateral movement of the wires as they are positioned within stator slot 35. Inter-strand circulation currents are reduced by the disclosed structure due to the relatively random positioning of the individual electrically conductive wires 46 of the group of wires within the stator slot 35. For example, electrically conductive wires 46 of the coil 45 that are closer to the rotor poles 29 may experience a difference of induced voltage as compared to wires that are farther away from the rotor pole 29. By twisting the individual electrically conductive wires 46 as they are wound about the central opening 47, the conductors change position within each turn of the group of wires which results in generally averaging of the distance of the individual electrically conductive wires 46 from the rotor poles 29. As a result, the voltage induced in each of the electrically conductive wires 46 through the rotor poles 29 is generally averaged which reduces the inter-strand circulation caused by exposure of the individual wires to different induced voltages.

The relatively loose twisting of the electrically conductive wires 46 within the group of wires results in efficient volume utilization or packing of the wires within the stator slots 35 as best seen in FIG. 6. If the individual electrically conductive wires 46 of the group of wires are tightly twisted, the tightly twisted wires will form a relatively large, somewhat rigid generally circular structure. As coil 45 is slid onto its stator pole 28, relatively large air gaps may exist between adjacent turns of the group of wires. By relatively loosely twisting the electrically conductive wires 46, the individual wires are able to move laterally relative to each other as the coil 45 is slid onto its respective stator pole 28 and thus the individual wires may more efficiently fill the stator slots 35. Through such a structure, a greater volume of the conductor (e.g., copper wire) may be positioned within the stator slots 35. This higher density of the conductor results in a lower resistance through the coil 45 and, for a given voltage, a higher current carrying capacity and thus a more efficient operation of the switched reluctance motor 25.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method of fabricating a stator assembly of a rotary electric machine, comprising:
    providing a stator having a plurality of stator poles;
    forming a plurality of coils with each coil including a generally symmetrical cross-section by:
        supplying a plurality of electrically conductive wires to define a group of wires;
        twisting the group of wires at a predetermined rate;
        wrapping the group of wires a predetermined number of turns to form a coil; and
        the step of twisting the group of wires including twisting the group of wires along an entire length of each turn between approximately 1 and 5 twists per turn of the coil, and each electrically conductive wire of each turn being laterally movable relative to others of the electrically conductive wires of the turn along at least a portion thereof;
    mounting each coil around a single stator pole including laterally moving at least some of the electrically conductive wires of each turn to modify the coils so as to form a generally asymmetrical cross-section across a portion thereof.

2. The method of claim 1, further including providing a fixture, the wrapping step further includes wrapping the group of wires around the fixture, and removing the coil from the fixture.

3. The method of claim 1, further including laterally moving at least a portion of at least some of the plurality of the electrically conductive wires of each turn relative to other electrically conductive wires of the turn while mounting the coil on its respective stator pole.

4. The method of claim 1, wherein each coil has a pair of major sides and a pair of minor sides, each minor side interconnecting the pair of major sides, and the portions of the electrically conductive wires being laterally movable are along the major sides of the coil and, upon mounting each coil around the single stator pole, moving the portions of the electrically conductive wires so that they are no longer laterally movable.

5. The method of claim 1, wherein the stator includes a plurality of stator slots, each stator slot being positioned between a pair of the stator poles, and wherein the mounting step includes positioning the electrically conductive wires of each coil within each slot to generally eliminate uniform voids between adjacent turns of the group of wires along a cross-section of each coil across each stator slot.

6. The method of claim 1, wherein the mounting step includes sliding each coil onto its respective stator pole.

7. A method of fabricating a stator assembly of a rotary electric machine, comprising:
  providing a stator having a plurality of stator poles;
  forming a plurality of coils, each coil having a generally symmetrical cross-section, by:
    supplying a plurality of electrically conductive wires to define a group of wires;
    twisting the group of wires at a predetermined rate;
    wrapping the group of wires a predetermined number of turns to form a coil; and
    the steps of twisting the group of wires and wrapping the groups of wires causing each electrically conductive wire of each turn to be laterally movable relative to others of the electrically conductive wires of the turn along at least a portion thereof; and
  mounting each coil on a stator pole, the step of mounting each coil including laterally moving at least some of the electrically conductive wires of each turn to modify the coils so as to form a generally asymmetrical cross-section across a portion thereof.

8. The method of claim 7, wherein the twisting step further includes twisting the group of wires between approximately 1 and 5 twists per turn of the coil.

9. The method of claim 7, further including providing a fixture, the wrapping step further includes wrapping the group of wires around the fixture, and removing the coil from the fixture.

10. The method of claim 7, further including laterally moving at least a portion of at least some of the plurality of the electrically conductive wires of each turn relative to other electrically conductive wires of the turn while mounting the coil on its respective stator pole.

11. The method of claim 7, wherein the step of laterally moving at least some of the conductive wires of each turn includes creating a cross section along a portion of each turn having a non-uniform array of electrically conductive wires.

12. The method of claim 7, wherein each coil has a pair of major sides and a pair of minor sides, each minor side interconnecting the pair of major sides, and the portions of the electrically conductive wires being laterally movable are along the major sides of the coil and, upon mounting each coil on the stator pole, moving the portions of the electrically conductive wires so they are no longer laterally movable.

13. The method of claim 7, wherein the stator includes a plurality of stator slots, each stator slot being positioned between a pair of the stator poles, and wherein the mounting step includes positioning the electrically conductive wires of each coil within each slot to generally eliminate uniform voids between adjacent turns of the group of wires along a cross-section of each coil across each stator slot.

14. A method of fabricating a stator assembly of a rotary electric machine, comprising:
  providing an open slot stator having a plurality of stator poles;
  forming a plurality of coils by:
    supplying a plurality of electrically conductive wires to define a group of wires;
    twisting the group of wires at a predetermined rate;
    wrapping the group of wires a predetermined number of turns to form a coil, the coil having a central opening; and
    the step of twisting the group of wires including twisting the group of wires along an entire length of each turn between approximately 1 and 5 per turn of the coil, and each electrically conductive wire of each turn being laterally movable relative to others of the electrically conductive wires of the turn along at least a portion thereof;
  sliding each coil onto one of the plurality of stator poles, the stator pole being inserted through the central opening of the coil; and
  laterally moving at least some of the electrically conductive wires of each turn relative to other electrically conductive wires of the turn and creating a plurality of groups of wires each having a different cross section along a portion thereof.

15. The method of claim 14, wherein the step of laterally moving at least some of the electrically conductive wires occurs while sliding the coil onto one of the plurality of stator poles.

16. The method of claim 14, further including laterally moving at least a portion of at least some of the plurality of the electrically conductive wires of each turn relative to other electrically conductive wires of the turn while sliding the coil onto its respective stator pole.

17. The method of claim 14, wherein each coil has a pair of major sides and a pair of minor sides, each minor side interconnecting the pair of major sides, and the portions of the electrically conductive wires being laterally movable are along the major sides of the coil and, upon sliding each coil onto one of the plurality of stator poles, moving the portions of the electrically conductive wires so they are no longer laterally movable.

* * * * *